Figure 1:
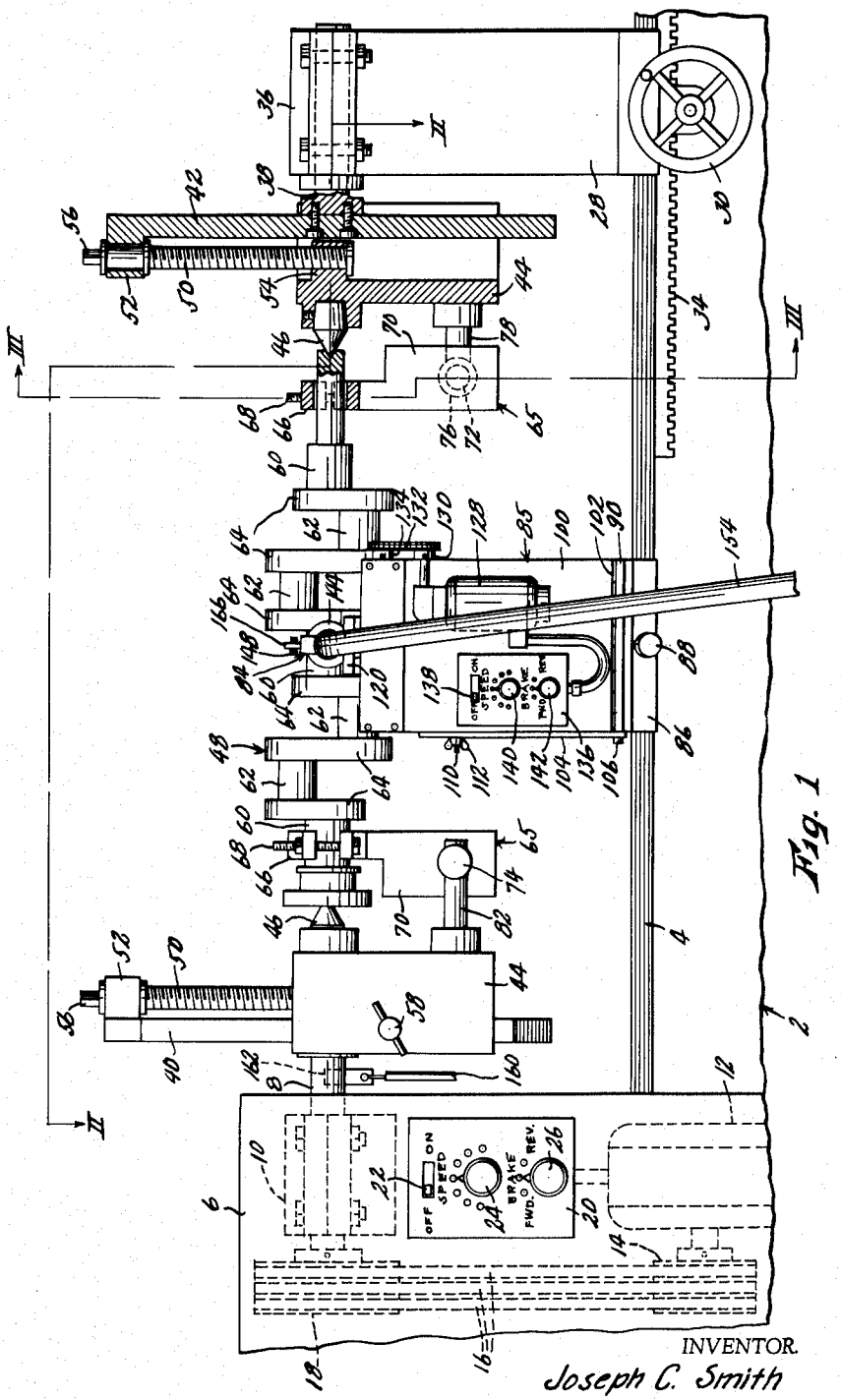

Sept. 7, 1965    J. C. SMITH    3,205,336
CRANKSHAFT WELDING MACHINE
Filed March 19, 1963    3 Sheets-Sheet 1

INVENTOR.
Joseph C. Smith
BY John A. Hamilton
Attorney.

INVENTOR.
Joseph C. Smith
BY John A. Hamilton
Attorney.

Sept. 7, 1965   J. C. SMITH   3,205,336
CRANKSHAFT WELDING MACHINE
Filed March 19, 1963   3 Sheets-Sheet 3
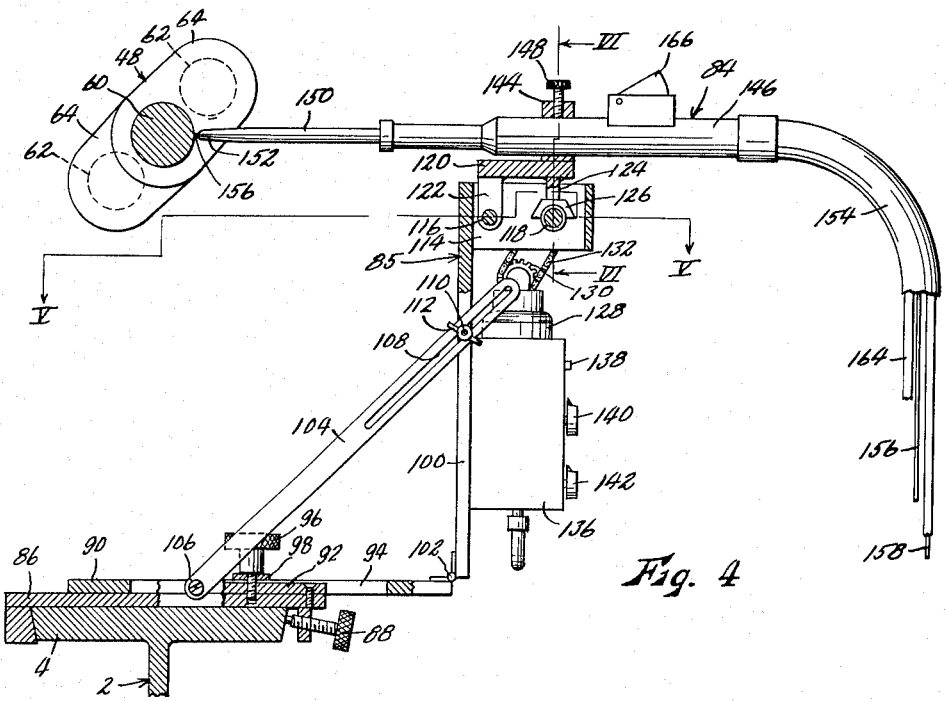
Fig. 4
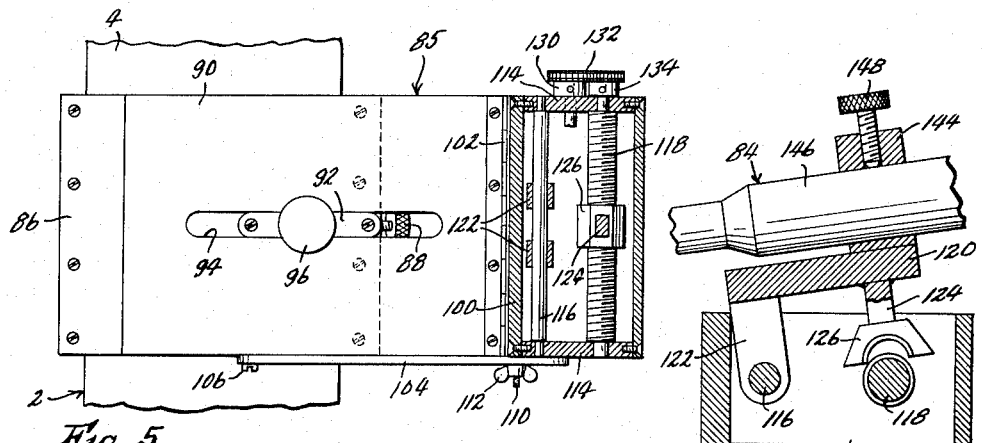
Fig. 5
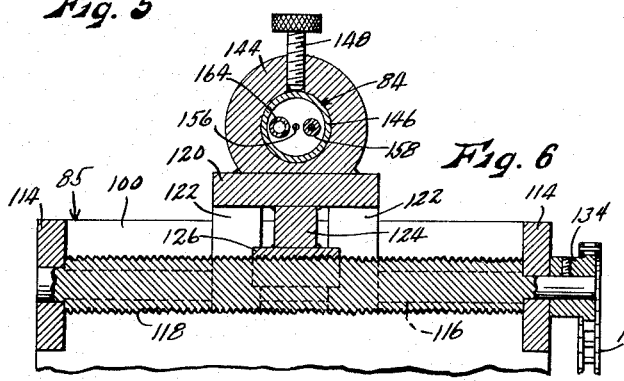
Fig. 6
Fig. 7
INVENTOR.
Joseph C. Smith
BY
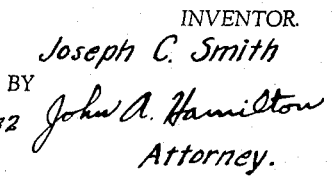
Attorney.

United States Patent Office 3,205,336
Patented Sept. 7, 1965

1

3,205,336
CRANKSHAFT WELDING MACHINE
Joseph C. Smith, Shawnee, Kans., assignor to Peterson Machine Tool, Inc., Merriam, Kans., a corporation of Missouri
Filed Mar. 19, 1963, Ser. No. 266,446
13 Claims. (Cl. 219—76)

This invention relates to new and useful improvements in crankshaft welding machines. The bearing areas of crankshafts, both the main bearings and the piston rod bearings, sometimes become so badly worn that they become of less diameter than the minimum which can be accommodated by oversized journal bushings or the like, and it therefore becomes necessary either to build up the bearing diameter by adding metal thereto, or to discard the shaft. Metal may be added to the bearing surface by a welding process to increase the diameter thereof, and the bearing then reduced to the desired diameter as by grinding. The principal object of the present invention is the provision of a machine for carrying out the welding process easily, rapidly and accurately.

Generally, the above object is accomplished by the provision of means for rotating the crankshaft bearing about its axis and means for supporting a welding gun adjacent the bearing and causing it to move longitudinally of the bearing, whereby a helical weld bead is deposited on the surface of the bearing. Means also are provided for accurately relating the rotational speed of the crankshaft to the speed of movement of the welding gun to insure that the entire surface of the bearing will be covered.

Another object is the provision of means whereby the axis of the crankshaft may be shifted radially relative to the rotational axis of its supporting means, whereby any rod bearing thereof may be rotated about its own axis.

A still further object is the provision of means for supporting the welding gun which is adjustable to permit any desired attitude of the gun relative to the crankshaft, and driving means for transporting the welding gun which is reversible to permit welding from both ends of a bearing toward the center, whereby to relieve thermal stresses, and which is instantly disengageable both to permit rapid manual positioning of the gun, and to prevent damage to the mechanism in the event the tip of the gun should be allowed to engage one of the radial crank arms of the crankshaft.

Still another object is the provision of a machine of the character described in which the mechanism for supporting the welding gun may be furnished as a self-contained unit which may be applied to pre-existing crankshaft grinding machines, which of course already include means for supporting and rotating a crankshaft.

Other objects are simplicity and economy of construction, efficiency and dependability of operation, and adaptability for use in welding operations other than the repairing of crankshafts.

Figure 2:
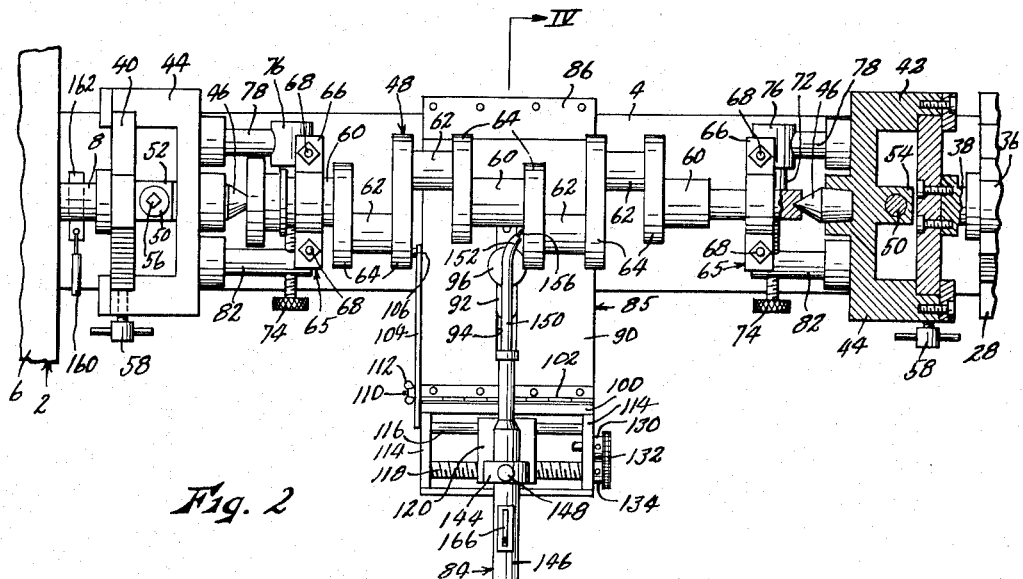
Figure 3:
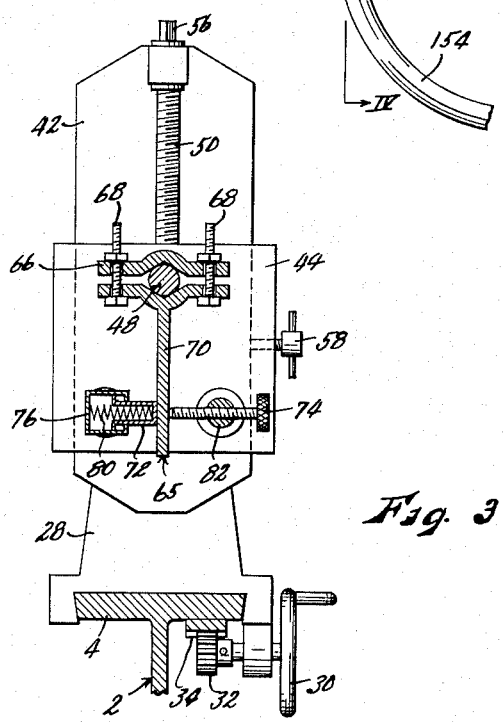

With these objects in view, as well as other objects which will appear in the course of the specification, reference will be had to the accompanying drawing, wherein:

FIG. 1 is a fragmentary front elevational view of a crankshaft welding machine embodying the present invention, with a crankshaft mounted operatively therein, and with parts broken away and shown in section, FIG. 2 is a fragmentary sectional view taken on line II—II of FIG. 1, FIG. 3 is a fragmentary sectional view taken on line III—III of FIG. 1, FIG. 4 is a slightly enlarged fragmentary sectional view taken on line IV—IV of FIG. 2, with parts left in elevation and broken away, FIG. 5 is a fragmentary sectional view taken on line V—V of FIG. 4, FIG. 6 is an enlarged fragmentary sectional view taken on line VI—VI of FIG. 4, and FIG. 7 is an enlarged fragmentary view similar to FIG. 4 but showing the welding gun tilted to disengage it from its power drive.

Like reference numerals apply to similar parts throughout the several views, and the numeral 2 applies to the frame of the machine, said frame being generally similar to that of a lathe, having a horizontally elongated bed 4 rigidly associated with a head casing 6. A head spindle 8 is rotatably mounted in a bearing 10 carried in said casing, said spindle extending outwardly from said casing above and in parallel relationship to bed 4. Said spindle is driven by a reversible, variable speed electric motor 12 through a pulley wheel 14, belts 16, and pulley wheel 18. Said motor is controlled from a panel 20 having an on-off switch 22, a knob 24 for controlling the speed of the motor, and a knob 26 which may be positioned to cause rotation of the motor selectively in either direction, and having a central "brake" position in which current to the motor is shut off and a brake is applied to halt the motor abruptly. The motor may of course be shut off with switch 22, but is shut off by turning knob 26 to its "brake" position where a fast stop is desired, as will be described.

Carried by frame bed 4 in spaced relation from head casing 6 is a tailstock 28 which is adjustably movable along the bed by a handwheel 30, which turns a pinion gear 32 meshed in a rack 34 carried by bed 4. At the upper end of the tailstock is a bearing 36 in which is rotatably mounted a tail spindle 38, said spindle being coaxial with head spindle 8. Fixed respectively to the confronting ends of spindles 8 and 38 are a pair of crossheads 40 and 42, each of said crossheads being essentially planar and disposed at right angles to the spindle axis. Mounted on each of said crossheads for sliding movement at right angles to the spindle axis is a center carrier 44 in which is fixedly mounted a conical center 46, the two centers being adapted to support a crankshaft 48 therebetween, as shown. Each crosshead has a screw 50 extending radially to the spindle axis, said screw being rotatably mounted in a boss 52 carried by the cross head but secured against axial movement therein, and threaded in a boss 54 of carrier 44. Each screw is provided at its outer end with a squared wrench lug 56 whereby it can be turned by a suitable wrench, so as to move center 46 either into coaxial alignment with the spindle axis, as shown, or radially out of registry with the spindle. Each carrier 44 is provided with a set screw 58 for fixing it relative to the associated crosshead when the desired adjustment has been attained.

Crankshaft 48 is shown in a merely representative form. In common with crankshafts in general, it includes two or more (three shown) coaxial main bearings 60 by which the shaft is ordinarily supported, and a plurality of piston rod bearings 62 parallel to but radially offset from the main bearing axis, adjacent bearings being rigidly interconnected by crank arms 64, also forming parts of the crankshaft. All of the bearings are of course cylindrical in form, and centers 46 engage the shaft coaxially with the main bearings.

A pair of rotation locks 65 are secured to the crankshaft respectively adjacent the opposite ends thereof. Each of said locks includes a clamp 66 secured rigidly to the shaft by bolts 68, and a planar arm 70 affixed to and extending radially from said clamp. Arm 70 is gripped between a spring-loaded plunger 72 and an adjusting screw 74 carried by the associated center carrier 44, said plunger and screw being disposed transversely to and radially offset from center 46. As best shown in FIG. 3, plunger 72 is slidably mounted in a housing 76 mounted on a post 78 fixed in carrier 44, and urged outwardly from said housing toward arm 70 by a spring 80. Screw 74 is threaded in a post 82 fixed in carrier 44.

When screws 50 are turned to bring centers 46 into exact coaxial alignment with spindles 8 and 38, operation of motor 12 of course causes axial rotation of main bearings 60 of the shaft. Rotation 65 at the headstock end of the shaft insures that the shaft will turn concurrently with head spindle 8. In this case the lock 65 at the tailstock end of the shaft need not be used, since it is immaterial whether tail spindle 38 turns or not. When it is desired to turn any one of rod bearings 62 about its axis, clamps 66 of rotation locks 65 are first loosened and the crankshaft is turned on centers 46 until the axis of the rod bearing is disposed in the plane of the axes of the two screws 50. Fine adjustments in this respect can be made, after clamps 66 are tightened, by turning adjusting screws 74. Screws 50 are then turned to offset carriers 44 and centers 46 from the axis of spindles 8 and 38, until the desired rod bearing is coaxial with the spindles. The rotation lock 65 at the tailstock end of the crankshaft is necessary in this instance, since it is necessary that the two crossheads 40 and 42 rotate in exact angular registry with each other.

The structure thus far described could be part of a crankshaft grinding machine, for grinding the bearings 60–62 of the crankshaft, such a structure being completed by a grinding wheel, not shown, supported and driven adjacent the crankshaft for engaging the bearings thereof as they are rotated as described above. One of the objects of the present invention is provision of means whereby, with a relatively simple and inexpensive addition, the heretofore described structure may be utilized as part of a machine for building up the diameters of worn shaft bearings by welding metal thereto.

The welding equipment includes a welding gun 84 supported by a gun carriage 85 including a base 86 supported on bed 4 for sliding movement therealong, and fixable at any position thereon by a set screw 88. A foot plate 90 is supported on said base for forward and rearward sliding movement transverse to the axis of spindles 8 and 38, a block 92 fixed to said base being engaged in an elongated slot 94 of said foot plate. A clamp screw 96 threaded in block 92 is operable to press a washer 98 (see FIG. 4) against the top surface of the foot plate, whereby to secure said foot plate at any desired position relative to base 86. An upright planar panel 100 is pivoted by hinge 102 to the forward edge of foot plate 90, and extends upwardly therefrom. Said upright panel may be adjustably pivoted on hinge 102, but is normally held in fixed relation to the foot plate by an angled brace bar 104 pivoted to the foot plate at 106, and having formed therein a longitudinally elongated slot 108 engaged slidably over a screw 110 on which is threaded a clamping nut 112.

Affixed to an extending forwardly from the upper end portion of panel 100 are a pair of vertical side plates 114, between which extend a smooth shaft 116 and a screw 118. Said shaft and screw are parallel to the axis of spindles 8 and 38, and above them is disposed a small platform 120. Affixed to said platform are a pair of depending legs 122, the lower end of which are pivotally and slidably engaged on shaft 116, whereby platform 120 may be moved longitudinally of said shaft, and also tilted about said shaft, as indicated in FIG. 7. Also affixed to the platform is a depending leg 124 to the lower end of which is welded a half-nut 126 which normally engages operatively with screw 118, but which may be disengaged therefrom when platform 120 is tilted as in FIG. 7.

Screw 118 is mounted rotatably in side walls 114, and is driven by a reversible, variable-speed electric motor 128 through a sprocket wheel 130, sprocket chain 132, and sprocket wheel 134. Said motor is mounted on the forward face of panel 100, and is controlled from a control box 136 also mounted on panel 100, and providing the same controls provided by panel 20 in the case of motor 12, namely an on-off switch 138, a knob 140 for regulating the speed of the motor, and a knob 142 providing for selective forward or reverse operation of the motor and having a central "brake" position. These motor controls are common and well understood in the art, and are therefore not shown here in detail.

Welded to the top surface of platform 120 is a mounting ring 144 which receives the tubular shank portion 146 of welding gun 84 slidably and rotatably therein, and in which said gun shank is releasably secured by set screw 148. The welding gun is provided with a tubular tip or nozzle 150 attached to shank 146 and extending closely adjacent the crankshaft to be welded, the extreme tip portion 152 of the nozzle being angled as best shown in FIG. 2. Said gun is not here detailed. Guns of this type are commercially available and well understood in the welding art, and may be of any type capable of applying metal by an electric welding process to any metallic surface to which the nozzle 150 is held. It is supplied through a flexible hose 154 through which extends a flexible welding rod 156 which also extends through the tip of nozzle 150, shank 146 containing means for propelling the welding rod as needed. Hose 154 communicates with a generator truck, not shown, which contains a reel supply of welding rod, and also a generator for supplying the welding current. One terminal of the generator is connected to a conductor wire 158 enclosed in hose 154 and connected within gun shank 146 to welding rod 156. The other terminal of the generator is connected by a wire 160 (see FIGS. 1 and 2) to a suitable brush 162 contacting head spindle 8. Hose 154 may also contain a tubular hose 164 supplied with an inert gas from a source of supply on the generator truck, and operable to direct said gas from the tip of nozzle 150 so as to sheathe the welding rod at that point. The function of this gas is to prevent access of atmospheric oxygen to the welding zone, whereby to prevent scaling and otherwise improve the quality of the weld. The welding current, welding rod propelling means, and sheathing gas are controlled by a trigger 166 mounted on gun shank 146.

In operation, the crankshaft 48 is first positioned between centers 46 as shown, the distance between said centers being adjusted to the length of the crankshaft by means of handwheel 30, and the rotation locks 65 are applied. By properly adjusting said rotation locks, and by adjusting screws 50, both as previously described, any desired main bearing 60 or rod bearing 62 of the crankshaft may be brought into accurate coaxial alignment with spindles 8 and 38, so that operation of motor 12 will cause axial rotation of said bearing. Set screw 88 is then loosened and gun carriage 85 is moved along bed 4 until the tip of gun nozzle 150 is adjacent the desired bearing. Then, by moving foot plate 90 forwardly or rearwardly after loosening clamp screw 96, or by tilting panel 100 forwardly or rearwardly after loosening nut 112, or by sliding the welding gun forwardly or rearwardly in ring 144 after loosening set screw 148, the welding gun is brought into the desired attitude relative to the crankshaft, that is, with the nozzle tip at the proper welding distance from the shaft, and usually at or below the horizontal midplane of the shaft bearing, although the vertical elevation of the tip may be changed as desired for different jobs. Also, the gun is rotated in ring 144 so that the angled tip 152 of the nozzle extends toward the end of the shaft bearing at which it is desired to start the weld (see FIG. 2).

By means of knob 24, the speed of motor 12 is preselected to provide, for a bearing of any given diameter, a relative lineal speed of the bearing surface relative to the gun nozzle which is equal to the speed at which the gun is capable of applying a weld bead. Knob 26 is set to provide for operation of motor 12 in the desired direction. Generally, it is desired that the top part of the bearing be moving away from the gun, so that the last part of the weld applied may be readily observed and the quality thereof evaluated, but opposite rotation may sometimes be desired. Knob 140 is set to pre-select the speed of motor 128 so that during the time required for the crankshaft to make one revolution, the gun will be advanced parallel to the shaft axis by a distance equal to the effective width of the weld bead applied by the gun. Knob 142 is set to provide for operation of motor 128 in such a direction that it will, acting through screw 118 and nut 126, advance gun platform 120 in the desired direction. As a final preliminary step, gun platform 120 is tilted as shown in FIG. 7 to disengage nut 126 from screw 118, and moved slidably along rod 116 until the gun nozzle is disposed at the proper welding distance from the crank arm 64 at the end of the bearing being welded. The gun weight is so distributed that it normally holds nut 126 firmly down in engagement with screw 118.

The operator then closes switch 22 to start motor 12 in operation at the preset speed and direction to rotate the crankshaft, and gun trigger 166 is pressed to start the welding. Since motor 128 is not then operating, this causes a filet weld to be applied in the angle between the crank bearing and the crank arm. When this filet weld is complete, the operator closes switch 138 to set motor 128 in operation at the preset speed and direction so that the welding gun is advanced parallel to the shaft axis. This causes the gun to apply a helical weld bead to the bearing surface, and if the speeds of motors 12 and 128 have been properly selected, the bead will cover the bearing surface completely and with reasonably uniform thickness. The welding process is preferably stopped when the middle of the bearing length is reached. Set screw 148 is then loosened and the gun twisted so that the angled nozzle tip 152 thereof extends toward the opposite end of the bearing, gun platform 120 is titled and moved so that the nozzle tip is at welding distance from the crank arm at said opposite end of the bearing, rotation of motor 128 is reversed by means of knob 142, and the welding operation repeated, again working toward the center of the bearing, until the bearing surface is all covered. Working from both ends of the bearing toward the center is of course not essential, but is believed to provide a better distribution of heat resulting in less thermal stress and distortion of the crankshaft.

The rapid stopping of motor 12 by moving knob 26 to its central "brake" position may be useful, for example, where it is desired to halt a weld precisely at one angular position on the shaft bearing. Similar stopping of motor 128, by moving knob 142 to its central position, may be useful to stop the welding process abruptly at any given longitudinal position of the crankshaft, or to prevent the gun from being propelled against a crank arm 64 or other obstruction. The quick detachability of nut 126 from screw 118 by tilting platform 120 provides for quick positioning of the welding gun longitudinally of the crankshaft, and also is a safety provision in that if the gun nozzle 150 should accidentally be allowed to engage a crankshaft arm 64, gun platform 120 can halt, thereby preventing damage to the parts, by tilting slightly under the radial urge of the V-shaped teeth of screw 118, whereby to disengage nut 126 from the screw and to permit continued rotation of the screw.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A crankshaft welding machine comprising:
    (a) a frame,
    (b) means carried by said frame for supporting a crankshaft and rotating it about the axis of any of the bearing sections thereof,
    (c) a welding gun operable to apply weld metal to any metallic surface moved adjacent the nozzle thereof, and
    (d) means for supporting said welding gun with its nozzle adjacent a bearing surface of said crankshaft and for moving said gun longitudinally of said crankshaft.

2. A crankshaft welding machine as recited in claim 1 wherein said crankshaft supporting means comprises:
    (a) a pair of coaxial, spaced apart spindles carried by said frame,
    (b) means for rotating one of said spindles about its axis,
    (c) a pair of crossheads affixed respectively to the confronting ends of said spindles,
    (d) a center carrier mounted on each of said crossheads for adjustable movement radially to the axis of the associated spindle,
    (e) a pair of centers carried respectively by said center carriers, said crankshaft being adapted to be mounted between said centers, and
    (f) locking means for preventing rotation of said crankshaft relative to said center carriers and crossheads.

3. A crankshaft welding machine as recited in claim 2 wherein said locking means is adjustable to permit axial turning of said crankshaft around the axis of said centers.

4. A crankshaft welding machine as recited in claim 2 wherein said locking means comprises:
    (a) a pair of clamps adapted to be affixed to said crankshaft respectively adjacent opposite ends thereof,
    (b) an arm affixed to said clamp so as to extend radially from said crankshaft, and
    (c) a pair of stop members carried by the adjacent center carrier and engaging said arm therebetween, said stop members being adjustably movable relative to said center carrier in a direction transverse to the axis of said centers.

5. A crankshaft welding machine as recited in claim 4 wherein one of said stop members constitutes a spring loaded plunger engaging and urging said arm in one direction, and the other of said stop member constitutes a screw threaded in said center carrier in alignment with said plunger and engaging said arm to resist movement thereof by said plunger.

6. A crankshaft welding machine as recited in claim 1 wherein said means for rotating said crankshaft and said means for moving said welding gun are independently adjustable to vary the speed of rotation of said crankshaft and the speed of movement of said welding gun.

7. A crankshaft welding machine as recited in claim 1 wherein said means for supporting and moving said welding gun comprises:
    (a) a gun carriage mounted on said frame for adjustable movement thereon in a direction parallel to the axis of the crankshaft,
    (b) a gun platform carried by said carriage for movement thereon parallel to the crankshaft axis, said welding gun being mounted on said carriage, and
    (c) power means carried by said carriage and operable to move said platform relative to said carriage.

8. A crankshaft welding machine as recited in claim 7 wherein said carriage is adjustable to permit movement of said gun platform in a direction transverse to the crankshaft axis, and to be pivoted about an axis parallel to the crankshaft axis, whereby the attitude of the welding gun relative to the crankshaft may be adjusted.

9. A crankshaft welding machine as recited in claim 7 wherein said power means for moving said gun platform relative to said gun carriage comprises:
 (a) a screw carried rotatably by said gun carriage with its axis parallel to the crankshaft axis,
 (b) a nut affixed to said gun platform and operably engaging said screw, and
 (c) an electric motor carried by said carriage and operable to turn said screw.

10. A crankshaft welding machine as recited in claim 9 wherein said electric motor is reversible and of variable speed, and with the addition of:
 (a) control means operable to reverse said motor, and
 (b) control means operable to vary the speed of said motor.

11. A crankshaft welding machine as recited in claim 9 wherein said electric motor is reversible and of variable speed, and with the addition of:
 (a) control means operable to reverse said motor,
 (b) control means operable to vary the speed of said motor, and
 (c) control means operable to vary the speed of rotation of said crankshaft.

12. A crankshaft welding machine as recited in claim 9 wherein said gun platform is mounted in said carriage for pivotal movement about an axis parallel to said crankshaft axis as well as for movement parallel to said axis, and wherein said nut is spaced radially apart from the pivotal axis of said platform and is of 180 degrees or less in angular extent, said nut being disposed above said screw so as to be urged into engagement with said screw by the weight of the platform and the welding gun carried thereby, and being disengageable from said screw by pivoting said gun platform.

13. A crankshaft welding machine as recited in claim 12 wherein the threads of said screw and nut are of V-shape, whereby continued rotation of said screw in the event movement of the platform is arrested by engagement of the gun with an obstruction will automatically cam said threads out of engagement.

References Cited by the Examiner
UNITED STATES PATENTS

| | | | |
|---|---|---|---|
| 1,489,699 | 4/24 | David | 219—137 |
| 2,299,747 | 10/42 | Harter | 219—76 |
| 2,427,350 | 9/47 | Carpenter et al. | 219—76 |

RICHARD M. WOOD, *Primary Examiner.*